United States Patent
Dean

(10) Patent No.: US 7,103,593 B2
(45) Date of Patent: Sep. 5, 2006

(54) SYSTEM AND METHOD FOR RETRIEVING INFORMATION FROM DISPARATE INFORMATION SOURCES IN A DECENTRALIZED MANNER AND INTEGRATING THE INFORMATION IN ACCORDANCE WITH A DISTRIBUTED DOMAIN MODEL/ONTOLOGY

(76) Inventor: Christopher James Dean, 10486 Mirage Ave., Brooksville, FL (US) 34614

( * ) Notice: Subject to any disclaimer, the term of this patent is extended or adjusted under 35 U.S.C. 154(b) by 797 days.

(21) Appl. No.: 10/171,916

(22) Filed: Jun. 14, 2002

(65) Prior Publication Data
US 2003/0233401 A1  Dec. 18, 2003

(51) Int. Cl.
G06F 17/30 (2006.01)
G06F 15/16 (2006.01)

(52) U.S. Cl. ............................. 707/5; 707/10; 709/219; 709/218; 709/203

(58) Field of Classification Search ................ 709/202, 709/245, 225, 219, 203, 218; 707/10, 5
See application file for complete search history.

(56) References Cited

U.S. PATENT DOCUMENTS

| | | | |
|---|---|---|---|
| 5,696,962 A * | 12/1997 | Kupiec | 707/4 |
| 5,987,446 A * | 11/1999 | Corey et al. | 707/3 |
| 6,078,914 A * | 6/2000 | Redfern | 707/3 |
| 6,275,820 B1 * | 8/2001 | Navin-Chandra et al. | 707/3 |
| 2002/0107982 A1 * | 8/2002 | Teodosiu et al. | 709/245 |
| 2002/0129145 A1 * | 9/2002 | Chow | 709/225 |
| 2005/0015466 A1 * | 1/2005 | Tripp | 709/219 |

* cited by examiner

*Primary Examiner*—Rupal Dharia
*Assistant Examiner*—Djenane Bayard

(57) ABSTRACT

A system and method are provided for retrieving and integrating disparate, heterogeneous information such as structured data, unstructured text, and images from different information sources in real-time. The system includes a plurality of client applications a model agent and a plurality of integration agents. Queries are written in terms of the classes, attributes, and relationships of the domain model as provided by the model agent. These queries for information are sent from a requesting client application to an appropriate integration agent based upon the data source it is responsible for. If the requested information is split among a plurality of integration agents that are each tied to a data source, the agent will broker the query by sending sub-queries to those agents directly, perform transformations on the data to match the model, and combine the information together for transmission to the requester. In this fashion, each integration agent can act as a broker and thus no centralized brokering system is required.

6 Claims, 4 Drawing Sheets

SYSTEM AND METHOD FOR RETRIEVING INFORMATION FROM DISPARATE INFORMATION SOURCES IN A DECENTRALIZED MANNER AND INTEGRATING THE INFORMATION IN ACCORDANCE WITH A DISTRIBUTED DOMAIN MODEL/ONTOLOGY

BACKGROUND OF THE INVENTION

1. Field of the Invention

The invention relates generally to accessing information and, more particularly, to retrieving information from disparate information sources and integrating the retrieved information in a user-defined format.

2. Description of the Related Art

We live in an information age. More information is being created and made available than ever before, due to the development of computers in general and access technologies in particular. For example, the Internet provides an unprecedented amount of information. However, there are problems to be solved. First, the information sought is normally stored in a distributed manner. For example, a single information source may store only a portion of the information sought and therefore other information sources may have to be separately accessed to gather the information sought. Second, even if the information sought is successfully located in one or more information sources, the information may not be readily available to a user for various reasons. For example, the portions of the information stored in different information sources may be in different formats such that the portions are not readily combinable without additional efforts on the part of the user. Third, using a single, centralized integration system to retrieve information from a number of different information sources and integrate the retrieved information may be impractical as the number of the information sources grows. Also, such a centralized integration system requires storing data in a data warehouse first and then fetch the data from the data warehouse, thereby providing possibly outdated data.

Therefore, there is a need for a system and method for retrieving information directly from disparate information sources without going through a data warehouse and integrating the retrieved information in a user-defined format. There is also a need for a system and method for retrieving and integrating such information in real-time without resorting to a single, centralized integration system.

SUMMARY OF THE INVENTION

A system and method are provided for retrieving information from one or more information sources in response to a query and integrating the information in accordance with a domain model or ontology. The query is based upon the classes, attributes and relations of the domain model. The system is based upon a computer network having one or more computer systems in communication with one another. The system includes a model agent, a plurality client applications, and a plurality of integration agents. The model agent, all client applications, and all integration agents have access to the domain model. The plurality of integration agents has access to the one or more information sources. A first integration agent receives the query from a client application and processes the query, via sub-queries, through at least one of the plurality of integration agents. The first integration agent then integrates information obtained from the plurality of integration agents and creates the query results. The integration of the query results is performed by combining results, transforming structure, and converting values. Meta-data in the model is also used not only to properly query data sources but to properly convert results as well.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1A:
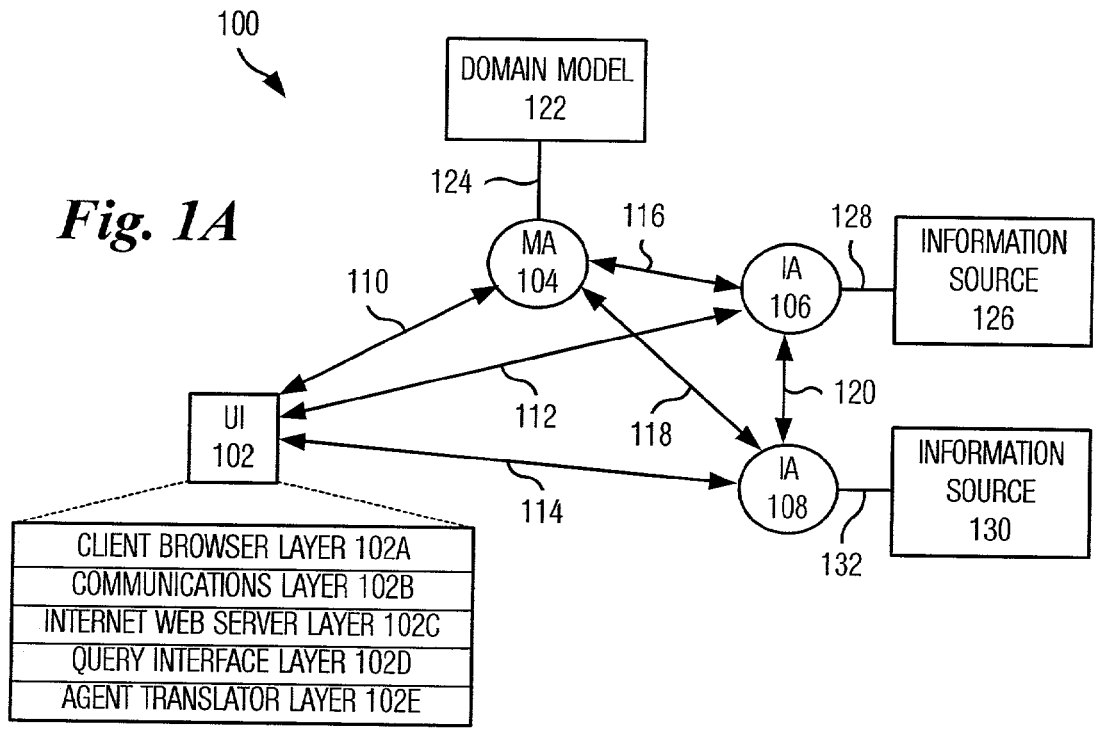
FIG. 1A is a block diagram illustrating an information system according to the present invention.

In FIG. 1A, a reference numeral 100 generally designates an information system according to the present invention. The information system 100 includes one of a plurality of client applications such as a user interface 102, model agent 104, a first integration agent 106, and a second integration agent 108. The user interface 102 is in communication with the model agent 104 through a communication link 110. The user interface 102 is also in communication with the first integration agent 106 and the second integration agent 108 through communication links 112 and 114, respectively. The model agent 104 is in communication with the first integration agent 106 and the second integration agent 108 through communication links 116 and 118, respectively. The first integration agent 106 is in communication with the second integration agent 108 through a communication link 120.

The user interface 102 is a software program installed in a user computer system (not shown). Specifically, the user interface 102 collectively represents all client applications between a user (not shown) or consumer program (not shown) of the information system 100 and various software agents such as the model agent 104 and the first and second integration agents 106 and 108. Specifically, the user interface 102 includes a client layer 102A (e.g., a web browser or other application), a communications layer 102B (e.g., TCP/IP), an Internet web server or application server layer 102C (e.g., IIS, Apache, Tomcat, etc), a query layer 102D (e.g., ColdFusion, Java), and an agent translator layer 102E (e.g., ColdFusion custom tags, JSP tags, Java interface).

The model agent 104, the first integration agent 106, and the second integration agent 108 are role-based software agents. Preferably, the model agent 104, the first integration agent 106, and the second integration agent 108 are installed in the user computer system. Alternatively, the model agent 104, the first integration agent 106, and the second integration agent 108 are installed in any of computer systems (not shown) in a network (not shown) including the user computer system. The network may have either wired or wireless connections between the computer systems. That is, the communication links 110, 112, 114, 116, 118, and 120 each are based upon either a wired physical link or a wireless physical link. For example, the user computer system having the user interface 102 may be a laptop computer or a handheld computer such as a personal digital assistant (PDA), whereas the other computer systems having such software agents may be connected through wired links (not shown). In this example, the communication links 110, 112, and 114 are based upon wireless physical links, whereas the communication links 116, 118, and 120 are based upon wired physical links.

The model agent 104 has access to a domain model 122 through a communication link 124. Preferably, the model agent 104 is installed in a computer system (not shown) that has access to a storage device (not shown) such as a hard disk, a floppy disk, CD-ROM, and RAM. The storage device may be either internal or external to the computer system. In this case, the communication link 124 includes a data bus (not shown) connecting the computer system and the storage device. Alternatively, the model agent 104 is installed in a computer system (not shown) that is connected to another computer system (not shown) having access to such a storage device. In both of these configurations, the storage device contains the domain model 122. Preferably, the computer system supports Java platform.

The first integration agent 106 has access to a first information source 126 through a communication link 128. Similarly, the second integration agent 108 has access to a second information source 130 through a communication link 132. The first and second information sources 126 and 130 each contain structured data and/or unstructured data. Optionally, the information system 100 can have one or more additional integration agents (not shown) depending on the network configuration of the information system 100.

Preferably, the user interface 102 maintains a copy of the domain model received from the model agent 104, and the user interface 102 receives model updates from the model agent 104 through the communication link 110. For example, the user interface 102 maintains a listener (not shown) that listens for model updates from the model agent 104. This way, the user interface 102 maintains a current domain model in real-time, as the integration agents 106 and 108 publishes model updates to the model agent 104.

The first and second integration agents 106 and 108 publish publication information (not shown) to the model agent 104. The publication information includes information on which portion of the domain model 122 each of the first and second integration agents 106 and 108 has access to. The model agent 104 provides the publication information to the first and second integration agents 106 and 108 such that the first and second integration agents 106 and 108 share the publication information among themselves through the model agent 104.

The user interface 102 receives one or more user inputs (not shown), and creates a query (not shown) based upon the one or more user inputs and the domain model 122. Preferably, the domain model 122 includes a plurality of classes (not shown) and one or more relations (not shown) among the plurality of classes. In this case, each class has one or more attributes. Preferably, the one or more user inputs are used to select at least a first class. The first class has a first set of one or more attributes. The one or more user inputs are also used to assign one or more associations to the first set of one or more attributes. Preferably, the one or more associations include one or more query criteria (e.g., strings, integers, floating point numbers, transforming functions, etc.).

The user interface 102 determines which of the first and second integration agents 106 and 108 to send the query to. Preferably, this determination is based upon the publication information received from the model agent 104 (only when the publication information actually changes). For example, if the query requires a query result available from the first information source 126 in whole or in part, then the publication information provided by the first integration agent 106 indicates that the query result is available from the first information source 126. Thus, the user interface 102 determines that the query should be sent to the first integration agent 106 in order to access the first information source 126. In case of a tie, other factors may be considered such as agent workload, CPU usage, network connectivity, etc. Alternatively, a user may specify a particular integration agent to which the query is initially sent.

Assuming that the query is initially sent to the first integration agent 106, the first integration agent 106 processes the query based upon the publication information provided by the model agent 104. Note that this publication information may also include the publication information from the second integration agent 108. First, the first integration agent 106 determines whether one or more sub-queries should be created from the query. If a single integration agent can fully process the query, then sub-queries need not be created from the query. For example, if the first information source 126 contains all query results corresponding to the query, then the first integration agent 106 can fully process the query without the help of the second integration agent 108. In this example, sub-queries need not be created from the query.

If, however, two or more integration agents are required to fully process the query, then sub-queries should be created from the query. For example, if the query requires first and second sub-query results, wherein the first sub-query result is available from the first information source 126 and the second sub-query result is available from the second information source 130, then the first integration agent 106 cannot fully process the query without the help of the second integration agent 108. In this case, first and second sub-queries need be created from the query. Assuming that the first and second sub-queries require the first and second sub-query results, respectively, the first sub-query should be handled by the first integration agent 106 and the second sub-query should be sent to the second integration agent 108. The first integration agent 106 processes the first sub-query and retrieves the first sub-query result from the first information source 126. Similarly, the second integration agent 108 processes the second sub-query and retrieves the second sub-query result from the second information source 130. The second integration agent 108 then sends the second sub-query result to the first integration agent 106. Subsequently, the first integration agent 106 integrates the first and second sub-query results and creates a query result corresponding to the query.

In either of these examples, the first integration agent 106 sends the query result to the user interface.

Typically, the data formats used by the first and second information sources 126 and 130 may be different than the data format of the domain model 122. Generally, the first and second integration agents 106 and 108 perform mappings and transformations on data coming from the first and second information sources 126 and 130 (e.g. map local database values to the domain model values such as local GREEN or 01 to green, transform back-end database values from one form to another such as a phone number from 9999999 to (999)999-9999 converting units such as miles to kilometers, and combining split back-end database values into one domain model value such as separate First and Last Name fields into a single domain Name field or separate block, dir, and street name fields into a single Address domain field). The domain model requires a consistent format across all data sources otherwise a client application would not be able to query the system without knowing specifics about the underlying data sources which is not integration.

There are various kinds of integration agents including Java DataBase Connectivity (JDBC), document, and email integration agents. In a preferred embodiment, however, JDBC integration agent configurations are used for the first and second integration agents 106 and 108. A JDBC integration agent maps model classes and attributes to their corresponding one or more tables and columns. For example, the JDBC integration agent maps a model class to one or more structured query language (SQL) tables. These mappings can use any native SQL that can be placed in a SELECT clause and thus can concatenate fields, perform sub-strings, etc. Such a JDBC integration agent will also automatically convert between model types and back-end information source types. For example, if a given attribute is of type STRING and the information source type is a DECIMAL, the JDBC integration agent will put in the necessary logic to convert the information into a proper form. The JDBC integration agent can also combine back-end tables together to form a single enterprise model class.

Although the information system 100 is shown to include only the first and second integration agents 106 and 108, additional integration agents (not shown) may be added to the information system 100 without departing from the true spirit of the present invention. Such additional integration agents will have the same interactions with other components of the information system 100 as the first and second integration agents 106 and 108 each have.

Figure 1B:
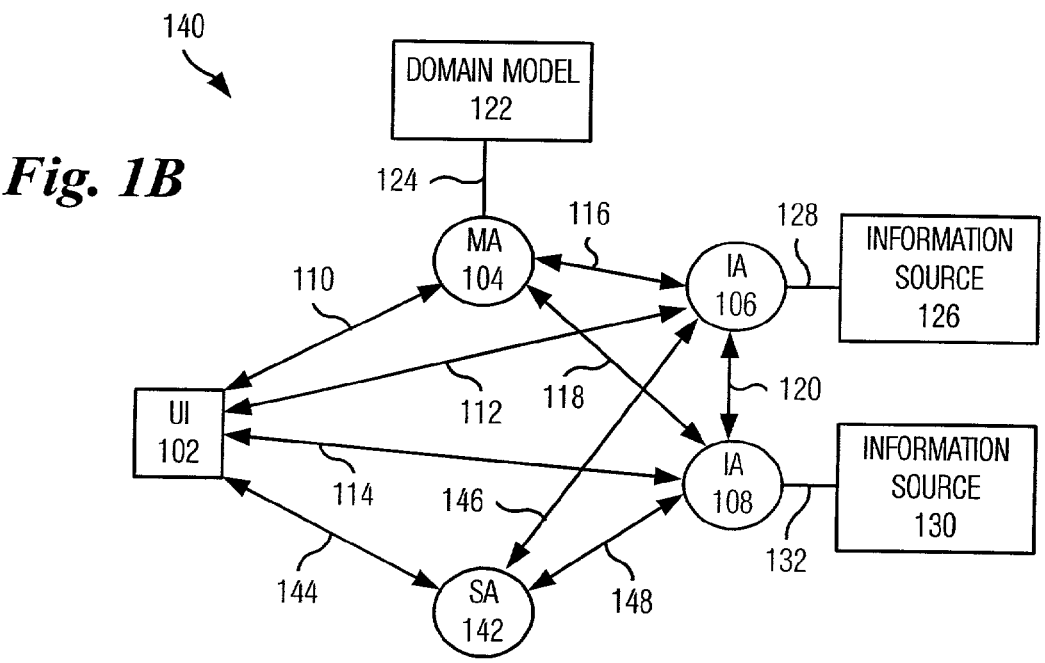
FIG. 1B is a block diagram illustrating the information system of FIG. 1A further including a security agent.

Now referring to FIG. 1B, a reference numeral 140 designates another information system including the information system 100 of FIG. 1A and a security agent 142. The security agent 142 is in communication with the user interface 102 through a communication link 144. Similarly, the security agent 142 is in communication with the first and second integration agents 106 and 108 through communication links 146 and 148, respectively. The security agent 142 is connected to a security database (not shown), which defines the users and their roles. Preferably, for each registered user, the security database contains user identification, a password, and a set of roles. The security agent 142 controls access to the roles assigned to users of the system. The roles restrict access to classes and attributes in the domain model 122 to users with the same corresponding roles. Preferably, the security agent provides the roles to the first and second integration agents 106 and 108 so that the first and second integration agents 106 and 108 evaluates the user's role(s) against requested classes and attributes in the query. If the role(s) have insufficient rights to access the requested classes and attributes specified in the query, any of the first and second integration agents 106 and 108 deny access. Alternatively, the security agent 142 evaluates each query received from the user interface 102 and evaluates the user's role(s) against requested classes and attributes in the query. If the role(s) have insufficient rights to access the requested classes and attributes specified in the query, the security agent 142 denies access.

Although the information system 140 is shown to include only the first and second integration agents 106 and 108, additional integration agents (not shown) may be added to the information system 140 without departing from the true spirit of the present invention. Such additional integration agents will have the same interactions with other components of the information system 140 as the first and second integration agents 106 and 108 each have.

Figure 2:
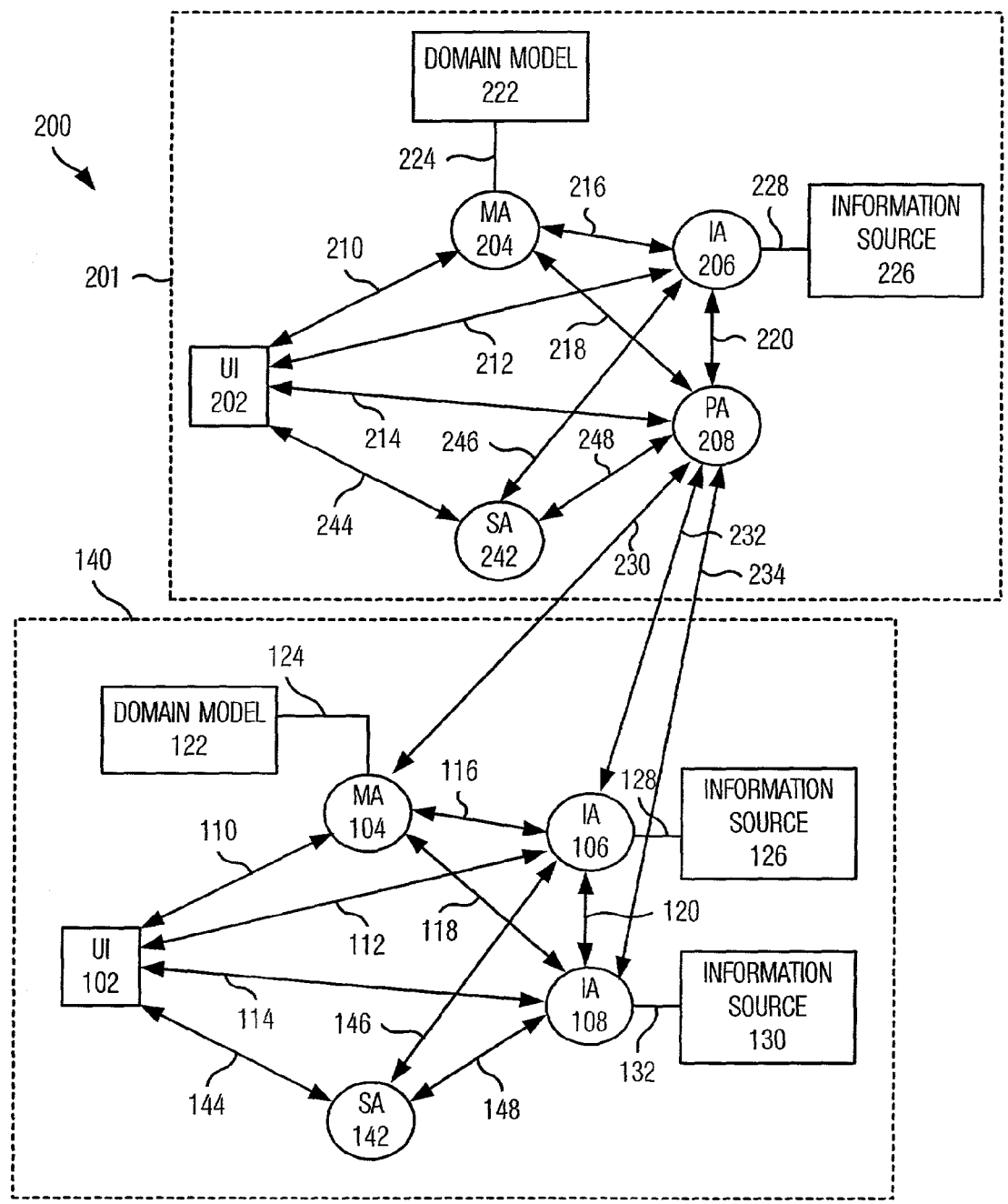
FIG. 2 is a block diagram illustrating an expanded information system using a proxy integration agent to connect two integrated systems according to the present invention.

Now referring to FIG. 2, an expanded information system 200 includes the information system 140 of FIG. 1 and a similar information system 201 in communication with the information system 150. Similarly to the information system 140, the information system 201 includes a user interface 202, model agent 204, a third integration agent 206, and a proxy integration agent 208. The user interface 202 is in communication with the model agent 204 through a communication link 210. The user interface 202 is also in communication with the third integration agent 206 and the proxy integration agent 208 through communication links 212 and 214, respectively. The model agent 204 is in communication with the third integration agent 206 and the proxy integration agent 208 through communication links 216 and 213 respectively. The third integration agent 206 is in communication with the proxy integration agent 208 through a communication link 220. Using this one embodiment of the invention, multiple disparate integration systems, each with their own domain model, can be integrated together hierarchically into another higher-level domain model thereby not restricting all systems to a "one size fits all" paradigm.

The user interface 202 is a software program installed in a user computer system (not shown). The model agent 204, the third integration agent 206, and the proxy integration agent 208 are role-based software agents. Preferably, the model agent 204, the third integration agent 206, and the proxy integration agent 208 are installed in the user computer system. Alternatively, the model agent 204, the third integration agent 206, and the proxy integration agent 208 are installed in any of computer systems (not shown) in a network (not shown) including the user computer system. The network may have either wired or wireless connections between the computer systems. That is, the communication links 210, 212, 214, 216, 218, and 220 each are based upon either a wired physical link or a wireless physical link. For example, the user computer system having the user interface 202 may be a laptop computer or a handheld computer such as a personal digital assistant (PDA), whereas the other computer systems having such software agents may be connected through wired links (not shown). In this example, the communication links 210, 212, and 214 are based upon wireless physical links, whereas the communication links 216, 218, and 220 are based upon wired physical links.

The model agent 204 has access to a domain model 222 through a communication link 224. Preferably, the model agent 204 is installed in a computer system (not shown) that has access to a storage device (not shown) such as a hard disk, a floppy disk, CD-ROM, and RAM. The storage device may be either internal or external to the computer system. In this case, the communication link 224 includes a data bus (not shown) connecting the computer system and the storage device. Alternatively, the model agent 204 is installed in a computer system (not shown) that is connected to another computer system (not shown) having access to such a storage device. In both of these configurations, the storage device contains the domain model 222.

The third integration agent 206 has access to a third information source 226 through a communication link 228. The proxy integration agent 208 is in communication with the model agent 104 through a communication link 230. Also, the proxy integration agent 208 has access to the first and second information sources 126 and 130 through communication links 232 and 234, respectively. The third information source 226 contains structured data and/or unstructured data. Optionally, the information system 201 can have one or more additional integration agents (not shown) depending on the network configuration of the information system 201.

The information system 201 further includes a security agent 242, which is in communication with the user interface 202 through a communication link 244. Similarly, the security agent 242 is also in communication with the third integration agent 206 and the proxy integration agent 208 through communication links 246 and 248, respectively. The security agent 242 is similarly configured to the security agent 142.

The operation of the information system 201 is generally similar to that of the information system 140 except for the operation of the proxy integration agent 208. Generally, when integration agents are used in a hierarchical approach having a regional setup (e.g., the information system 201) and a local setup (e.g., the information system 105), a proxy integration agent such as the proxy integration agent 208 is used, especially when firewalls are involved between the regional setup and the local setup. Specifically, the model agent 104 of the information system 140 publishes its subset of some higher global model to the information system 201. At the information system 201, the proxy integration agent 208 publishes this subset to the information system 201. The user interface 202 at the information system 201 can then access data at the information system 150 by querying the proxy integration agent 208, which pass the query onto the local integration agents such as the first and second integration agents 106 and 108. Preferably, the proxy integration agent 208 acts just like the integration agent 206 at the information system 201 and acts just like the user interface 102 at the information system 150. The proxy integration agent 208 acts as a pure pass-through or performs all the same mappings that a standard integration agent such as the third integration agent 206 can.

Although the information system 201 is shown to include only the third integration agent 206, additional integration agents (not shown) may be added to the information system 201 without departing from the true spirit of the present invention. Such additional integration agents will have the same interactions with other components of the information system 201 as the third integration agent 206 has.

Figure 3:
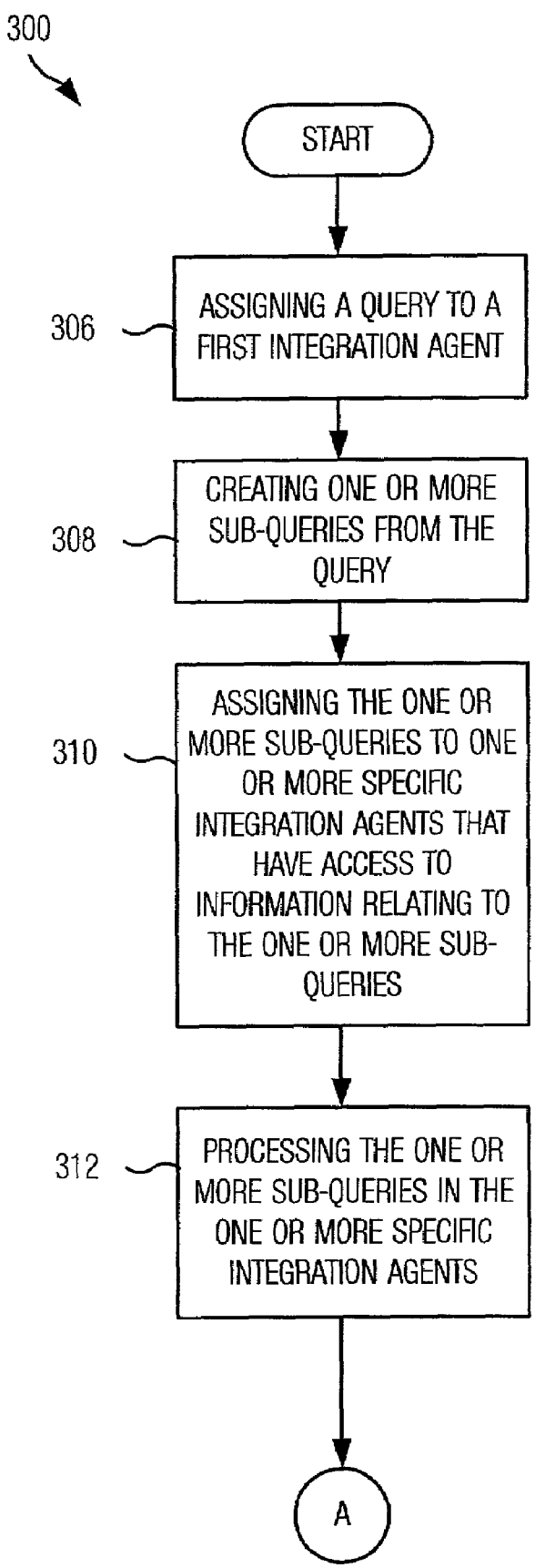
FIG. 3 is a flow diagram illustrating the operation of the information system according to the present invention.
Figure 3:
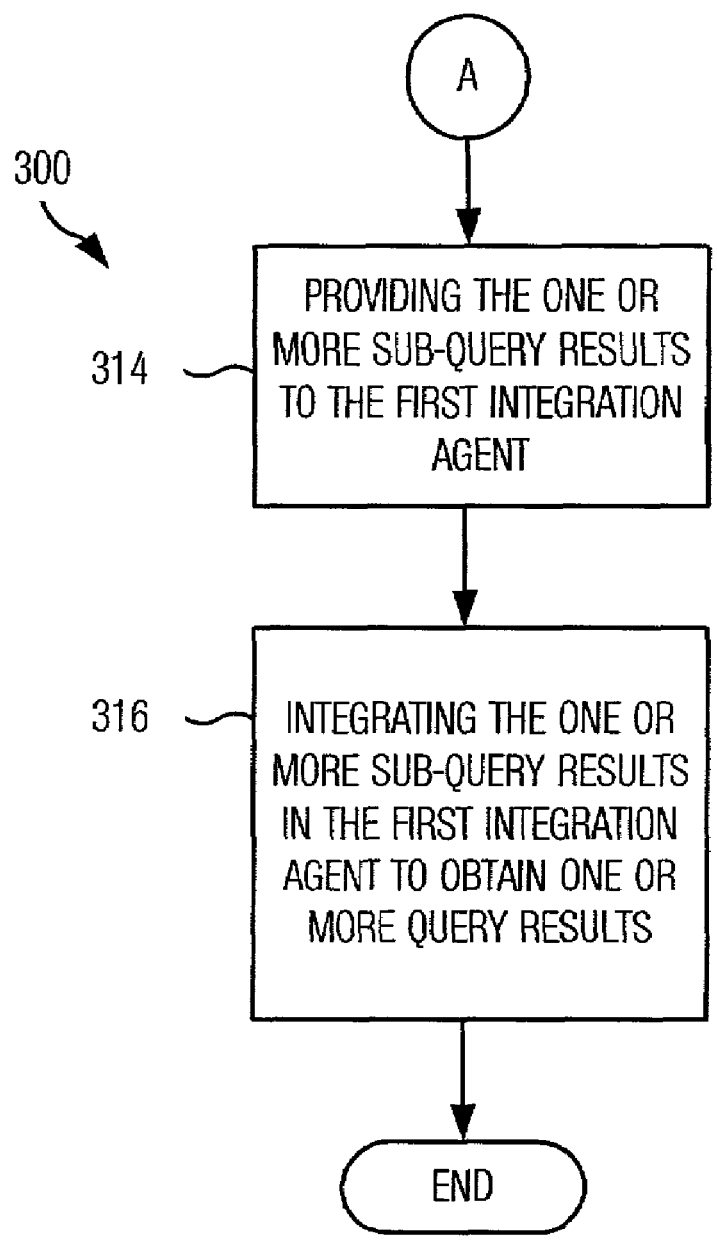

In FIG. 3, a flow diagram 300 depicts a high-level operation of the present invention. The flow diagram 300 will be described in reference to the information system 100 of FIG. 1A; however, the flow diagram 300 is also applicable similarly configured information system according to the present invention.

In step 306, a query is assigned to a first integration agent. In the information system 100, the user interface 102 assigns the query to the first integration agent 106. In step 308, one or more sub-queries are created from the query. If in step 308 no sub-query is created, then empty result is returned. However, in step 308, it is assumed that at least one sub-query is created for subsequent steps to be executed. In the information system 100, the first integration agent 106 creates the one or more sub-queries from the query.

In step 310, the one or more sub-queries are assigned to one or more specific integration agents that have access to information relating to the one or more sub-queries. In the information system 100, the first integration agent 106 assigns the one or more sub-queries to the one or more specific integration agents. For example, if the one or more sub-queries are available only from the first information source 126, the first integration agent 106 assigns the one or more sub-queries to the first integration agent 106 itself. If the one or more sub-queries are available only from the second information source 130, the first integration agent 106 assigns the one or more sub-queries to the second integration agent 108. If first and second sub-queries of the one or more sub-queries require access to the first and second information sources 126 and 130, respectively, then the first integration agent 106 assigns the first and second sub-queries to the first and second integration agents 106 and 108-, respectively.

In step 312, the one or more sub-queries are processed in the one or more specific integration agents. In the information system 100 of FIG. 1, for example, at least one of the first and second integration agents processes the one or more sub-queries. Specifically, if the one or more sub-queries are available only from the first information source 126, the first integration agent 106 processes the one or more sub-queries. If the one or more sub-queries are available only from the second information source 130, the second integration agent 106 processes the one or more sub-queries. If first and second sub-queries of the one or more sub-queries require access to the first and second information sources 126 and 130, respectively, then the first and second integration agents 106 and 108 process the first and second sub-queries, respectively.

Optionally, each of the one or more sub-queries is evaluated to determine whether a particular sub-query is a base query. A base query is defined herein as a query including a class having one or more sub-classes under the class. For example, a bird class has many sub-classes including bluebirds, robins, doves, sparrows, etc. When a user queries a base query including the bird class, the user may want to get results from all sub-classes such as a bluebird class, a robin class, and a dove class. In that case, the specific integration agent handling the base query can first perform the query for each sub-class under the base query and then combine the results. Preferably, a domain model includes information on the number and kind of sub-classes under a base query.

In step 314, the one or more specific integration agents provide the one or more sub-query results to the first integration agent. In step 316, the one or more sub-query results are integrated in the first integration agent to obtain one or more query results corresponding to the query.

As shown in the flaw diagram 300 in general and in steps 306, 310, 314, and 316 in particular, the present invention provides a decentralized architecture among a plurality of integration agents and the plurality of client applications. This decentralized architecture has numerous advantages over conventional integration information systems. For example, there is no single point of failure, because any one of the plurality of integration agents may assume the role of the first integration agent as in steps 306, 310, 314, and 316. Furthermore, there is no central broker for creating sub-queries that all queries must pass through as any one of the plurality of integration agents can assume the role of the first integration agent for the purposes of creating sub-queries as in steps 306, 310, 314, and 316. Any one of the plurality of client applications can communicate directly with any one of the plurality of integration agents that have assumed the role of the first integration agent.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. An information system for retrieving and combining information from one or more disparate, heterogeneous information sources in real-time, in response to a query and integrating the information in accordance with a domain model, the said query being based upon said domain model, said information system being based upon a computer network having one or more computer systems in communication with one another, said information system comprising: (a) a model agent residing in at least one of the said one or more computer systems, said model agent having access to said domain model; and (b) a plurality of client applications residing in one of said one or more computer systems; and (c) a plurality of integration agents in communication with one another, said model agent, and said plurality of client applications, and residing in at least one of said one or more computer systems, said plurality of integration agents having access to one of said one or more disparate, heterogeneous information sources, said plurality of integration agents publishing publication information to said model agent said publication information including information on which portion of said domain model each of said plurality of integration agents has access to, said model agent providing said publication information to said plurality of integration agents said plurality of client applications such that said plurality of integration agents and said plurality of client applications share said, publication information among themselves through said model agent only as changes occur, said plurality of integration agents including at least a first integration agent, wherein said first integration agent receives said query from one of said plurality of client applications, retrieves query results corresponding to said query from said one or more disparate, heterogeneous information sources through at least one of said plurality of integration agents, and integrates and transforms said query results, returning said query results to the requesting client of said plurality of client applications, whereby a user or application can simultaneous query multiple different systems without specific knowledge of each system's query format or data representation.

2. The information system of claim 1, wherein said first integration agent creates one or more sub-queries from said query, assigns said one or more sub-queries to at least one of said plurality of integration agents based upon said publication information, retrieves one or more sub-query results corresponding to said one or more sub-queries from said one or more information sources through the at least one of said plurality of integration agents, integrates said one or more sub-query results to create one query result in accordance with said domain model, and sends said one query result to requesting client of said plurality of client applications.

3. The information system or claim 1, wherein said domain model includes a plurality of classes and one or more one-to-one, one-to-many, many-to-one, or many-to-many relationships among said plurality of classes, each class having one or more attributes, each attribute having meta-data about its function and usage further comprising of type, allowable values, presentation order, length, allowable operators, and default values.

4. The information system of claim 1, wherein said query results provided by said one or more information sources from which said query results were retrieved, have inconsistent data formats and lexical representation, and wherein each of said plurality of integration agents has a means for mapping the inconsistent data formats and lexical representation of said query results into a consistent data format in accordance with said domain model.

5. The information system of claim 4, wherein the means for mapping said inconsistent data formats and lexical representation of said query results into a consistent data format in accordance with said domain model further comprises: a combining means for merging result attributes; a transformation means for modifying attribute(s) physical structure; a conversion means for adjustment of attribute units; and a mapping means for changing attribute values.

6. The information system of claim 1, further comprising a security agent in communication with said plurality of client applications and said plurality of integration agents and residing in at least one of said one or more computer systems, said security agent having access to a security database that defines users and their roles, wherein said plurality of client applications and said plurality of integration agents register with said security agent for security updates.

* * * * *